A. L. McCORMICK.
WEATHER STRIP FOR WIND SHIELDS FOR AUTOMOBILES.
APPLICATION FILED DEC. 24, 1914.
Reissued July 13, 1915. 13,945.
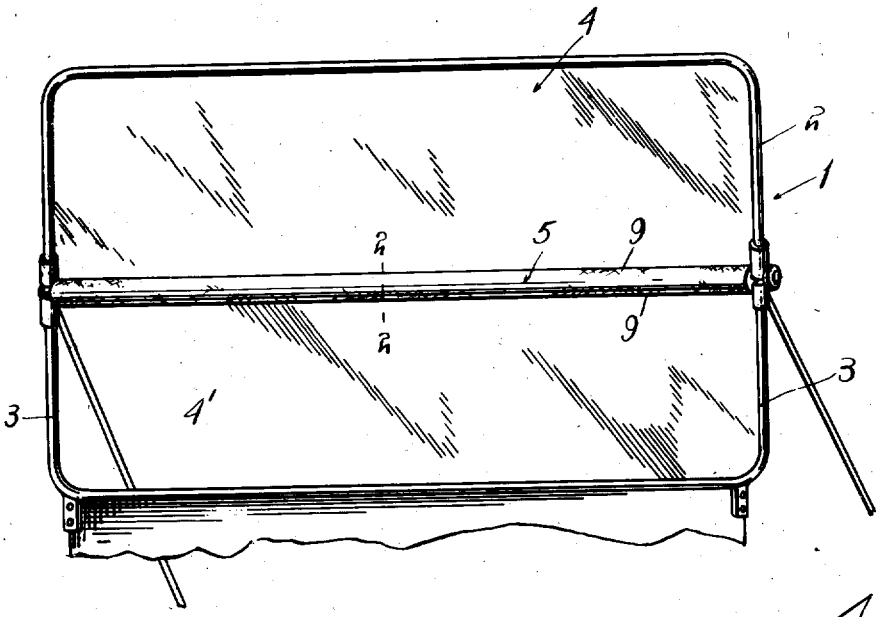
FIG. I.
FIG 2
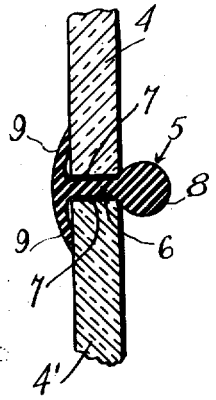
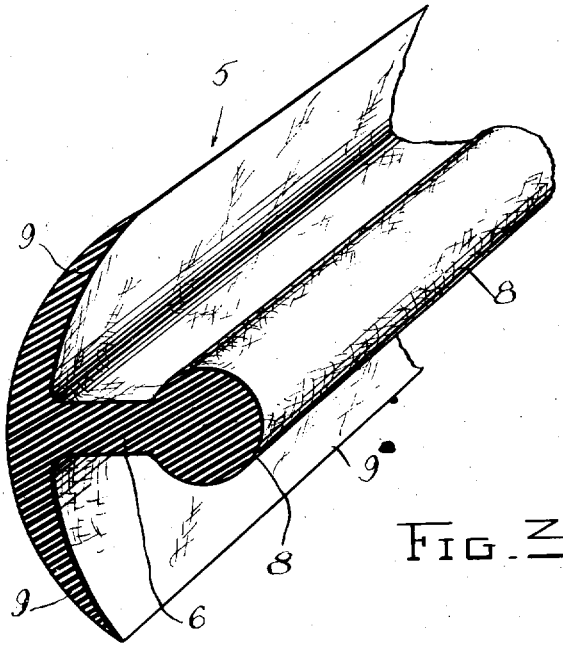
FIG. 3.
Inventor
A. L. McCormick
Witnesses
J. L. Simpson.
R. B. Cavanagh.
By Attorneys

UNITED STATES PATENT OFFICE

ALLEN L. McCORMICK, OF KANSAS CITY, MISSOURI.

WEATHER-STRIP FOR WIND-SHIELDS FOR AUTOMOBILES.

13,945. Specification of Reissued Letters Patent. Reissued July 13, 1915.

Original No. 1,107,819, dated August 18, 1914, Serial No. 805,395. Application for reissue filed December 24, 1914. Serial No. 878,834.

*To all whom it may concern:*

Be it known that I, ALLEN L. McCORMICK, a citizen of the United States, residing at Kansas City, in the county of Jackson, State of Missouri, have invented certain new and useful Improvements in Weather-Strips for Wind-Shields for Automobiles; and I do hereby declare the following to be a full, clear, and exact description of the invention, such as will enable others skilled in the art to which it appertains to make and use the same.

The present invention is directed to weather strips for automobiles, and has for its object to provide an article of this type which may be quickly applied to the wind shield to prevent rain from entering the space between the opposing edges of the upper and lower glass sections.

A further object of the invention is to so construct a device of this type which when in place will prevent rain from beating through the shield, the same being formed from rubber, so that it may be easily applied, and when in place will in no way injure the glass panes of the shield.

With the above recited objects and others of a similar nature in view, my invention consists in the construction, combination and arrangement of parts set forth in and falling within the scope of the appended claims.

In the accompanying drawings: Figure 1 is a perspective view of a wind shield showing the device in place. Fig. 2 is a sectional view on line 2—2 of Fig. 1. Fig. 3 is a fragmentary perspective view of the device.

Referring to the drawing, the numeral 1 designates the wind shield, comprising the upper and lower hingedly connected sections 2 and 3, respectively for supporting the glass panes 4 4′. A stopper 5 is formed from a single piece of comparatively soft rubber molded so as to provide a web 6 substantially the same length as the space 7 formed between the opposing edges of the panes 4 and 4′. The inner edge of the web 6 terminates in a rib 8 which is circular in cross section, and of the same length as the web 6. The forward edge of the web 6 terminates in oppositely directed flanges 9, said flanges being curved inwardly so that the upper edge of the uppermost flange will bear against the outer surface of the pane 4 and the lower edge of the lowermost flange will bear against the pane 4′, said flanges being of the same length as the web 6. From this construction, it will be seen that when the wind shield 1 is in its operative position that the web 6 will occupy the space between the opposing edges of the panes 4 and 4′, and that the rib 8 will engage the inner surfaces of the panes 4 and 4′ adjacent the space 7, and the curved flanges 9 will engage the outer surfaces of the panes 4 and 4′ in such a manner as to prevent rain from entering the space 7. By curving the flanges 9 it is obvious that there will be a tendency to draw the rib 8 tightly against the inner surfaces of the panes 4 and 4′ with the result that the edges of the flanges 9 will bear tightly against the outer surfaces of the panes, thus insuring a water-tight joint.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. In combination with a wind shield comprising upper and lower sections, glass panes carried by the sections and having their opposing edges spaced apart, of a strip formed from rubber and comprising a web for occupying the space between the opposing edges of the panes, the inner edge of said web terminating in a rib for engaging the inner surfaces of the panes, said web having its outer edge terminating in oppositely directed flanges, said flanges being curved inwardly and having their edges engaging the outer surfaces of the panes, as and for the purpose set forth.

2. A wind shield comprising two spaced sections and a strip occupying and closing the space between the sections, said strip including a web portion adapted to lie between the opposing edges of the sections, a member extending longitudinally of one side of the web portion and adapted to bear against the adjacent side of the shield, and a second member extending longitudinally of the opposite side of the web portion and adapted to bear against the opposite side of the shield from that side against which the first mentioned member bears.

3. A wind shield comprising two spaced sections, and an elastic strip having a web portion adapted to occupy the space between the adjacent edges of the sections and having members integral with the web portion and extending longitudinally of the side edges of the web portion, said members being adapted to bear against opposite sides of the shield.

4. The combination with a wind shield comprising a pair of spaced sections, of a weather strip adapted to close the space between said sections, said strip including a web portion, a bead extending longitudinally of one side of the web portion, and a flange extending longitudinally of the opposite side of the web portion.

5. The combination with a wind shield composed of two sections having their opposing edges spaced apart, of a strip including a web portion occupying the space between the opposing edges of the sections, one edge of said web terminating in a rib for engaging the adjacent side portions of the sections, said web having its other edge terminating in oppositely directed flanges adapted to engage the adjacent side portions of the sections.

In testimony whereof, I affix my signature, in the presence of two witnesses.

ALLEN L. McCORMICK.

Witnesses:

ROBT. O. SCOTT,

G. B. CARPENTER.